March 22, 1955 P. A. GOESER 2,704,451
TENDERNESS TESTING DEVICE
Filed April 7, 1951 3 Sheets-Sheet 1

INVENTOR.
Paul A. Goeser
BY
R. L. Story
ATTORNEY

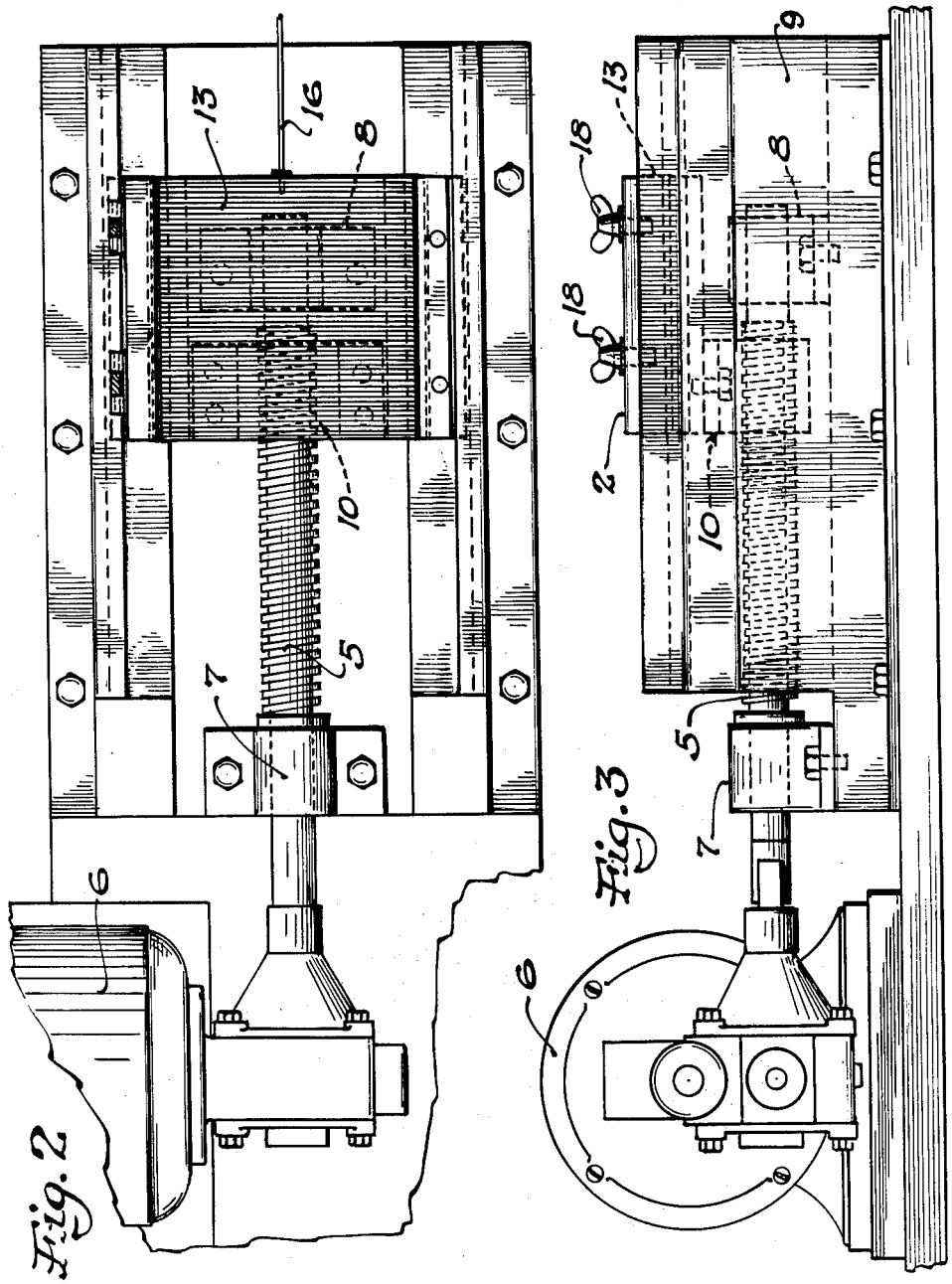

March 22, 1955  P. A. GOESER  2,704,451
TENDERNESS TESTING DEVICE
Filed April 7, 1951  3 Sheets-Sheet 3
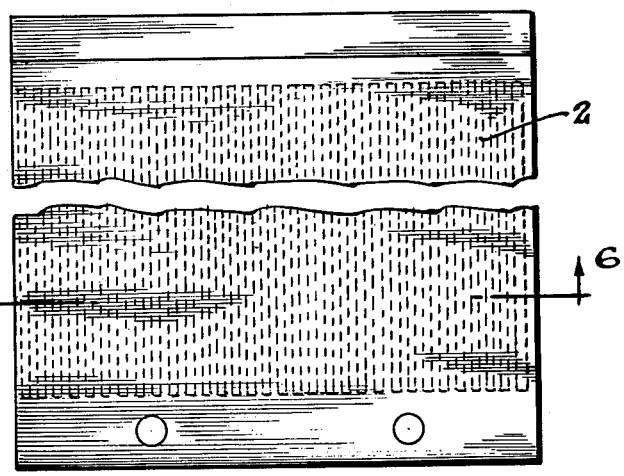
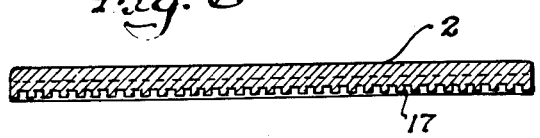
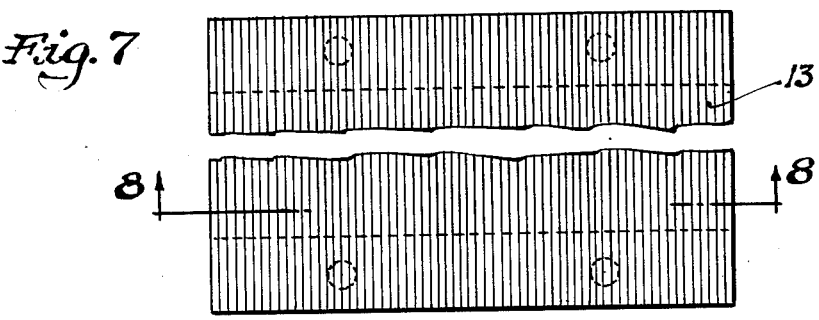
INVENTOR.
Paul A. Goeser
BY
R. G. Story
ATTORNEY

United States Patent Office 2,704,451
Patented Mar. 22, 1955

2,704,451

TENDERNESS TESTING DEVICE

Paul A. Goeser, Chicago, Ill., assignor to Swift & Company, Chicago, Ill., a corporation of Illinois Application April 7, 1951, Serial No. 219,830

4 Claims. (Cl. 73—78)

This invention relates to an improved apparatus for testing the tenderness of meat.

One of the objects of this invention is to provide an improved apparatus for testing the tenderness of a sample of meat.

Another object of this invention is to provide a testing apparatus employing means for macerating a sample of meat in which the resistance to the macerating action is accurately measured to determine the tenderness value of the meat sample.

Another object of this invention is to provide a machine that will give uniform results with regard to the tenderness values of meat samples, as compared with the standard organoleptic tests customarily made.

Other objects of the invention will be apparent from the description and claims which follow.

Reference is had to the accompanying drawings showing the elements of a machine forming the preferred embodiment of this invention:

Fig. 2 is a plan view of the machine shown in Fig. 1, with certain parts omitted;

Fig. 3 is a side elevational view of the machine shown in Fig. 2;

Fig. 5 is a plan view of the upper corrugated plate used in the apparatus shown in Fig. 1;

Fig. 6 is a cross-sectional view taken on line 6—6 of Fig. 5;

Fig. 7 is a plan view of the lower corrugated plate used in the apparatus shown in Fig. 1; and Fig. 8 is a cross-sectional view taken on line 8—8 of Fig. 7.

Figure 1:
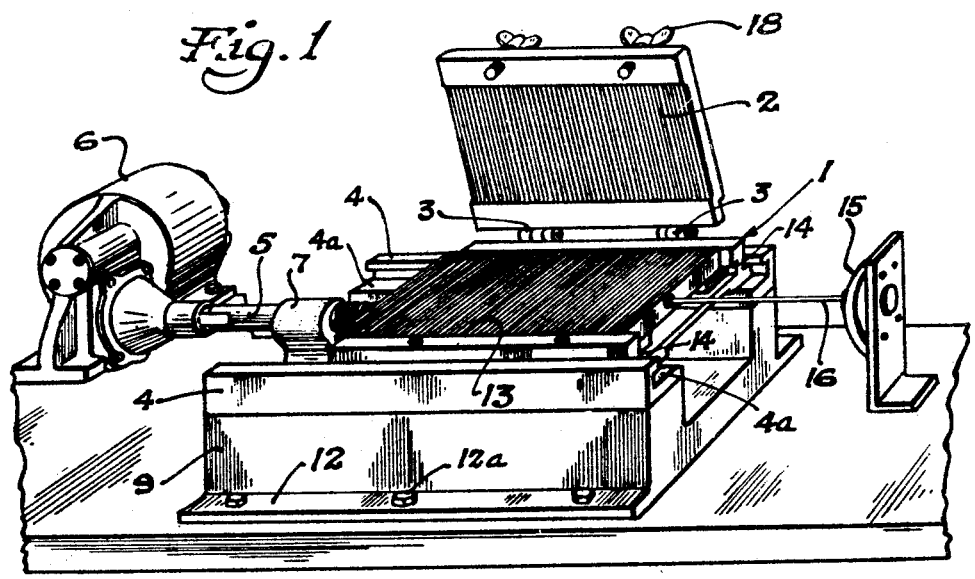
Fig. 1 is a perspective view of the improved testing machine together with associated mechanism for registering the force required to effect maceration of a meat sample.
Figure 4:
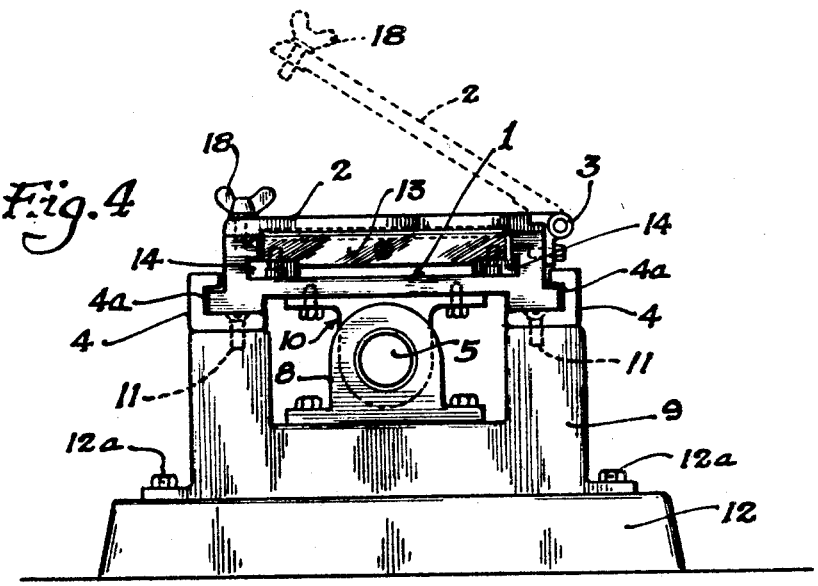
Fig. 4 is an end elevational view of the machine shown in Fig. 2, the motor drive being omitted.

In the drawings, reference numeral 1 indicates a carriage to which is affixed top corrugated plate 2 by means of hinge 3. Carriage 1 is mounted for sliding reciprocating movement in angle irons 4 forming horizontal guide tracks 4a. Carriage 1 is adapted to be positively driven along guide tracks 4a through the medium of shaft 5 and motor 6. Shaft 5 rides in bearing brackets 7 and 8 which are in turn rigidly secured to frame 9. Shaft 5 is secured to carriage 1 by means of a suitable rack and pinion gearing arrangement 10. Angle irons 4 are rigidly secured to frame 9 by means of suitable bolts 11. Frame 9 is in turn secured to base 12 by bolts 12a.

Upper corrugated plate 2 is adapted to be moved with carriage 1 since it is affixed thereto. Lower corrugated plate 13 is mounted for sliding movement on horizontal guide track 14 provided in carriage 1. Plate 13 is connected to a force measuring device 15 by any suitable connecting member and which may be rod 16. Connecting member 16 is secured to force measuring device 15 in any convenient manner so as to register a pulling force or tension on the dial scale of measuring device 15.

Plates 2 and 13 are provided with corrugations or ridges 17. In order to effect the desired maceration of the meat sample, it is important to provide both the upper and lower plates with a sufficient number of corrugations or ridges and grooves. Conveniently any suitable size plates may be used. In practice, however, I have found that by using a plate having about 8 grooves and 8 lands per linear inch, that is, by using plates of such dimensions as to provide in the upper plate 32 grooves 1/16 of an inch wide and 1/16 of an inch deep and 33 lands 1/16 of an inch wide, and providing in the lower plate 33 grooves and 32 lands of the same dimensions as in the upper plate, satisfactory results are obtained.

Plates 2 and 13 are adapted to be clamped together with their corrugated surfaces in opposed relationship by means of a suitable clamp or, as illustrated, by wing nuts 18. The plates are adapted to be clamped together with a clearance tolerance between the lands of the opposed plates of approximately 1/64 of an inch.

It is to be observed that only plate 2 is positively driven through the action of the mechanism previously described and that plate 13 is connected only to the device 15 for registering a pulling force. Therefore, when plate 2 is driven forwardly, plate 13 is carried with it solely due to the resistance set up by the sample of meat clamped between the plates. When this resistance has been overcome by rupture of the meat fibers, plate 13 will stop moving with plate 2 and the resistance will be recorded on the dial scale of force measuring device 15.

In the operation of the apparatus of the present invention, a thin slice of meat, preferably about 1/8 of an inch in thickness, is taken from an animal carcass. The slice is trimmed of excess fat and connective tissue and is cut so as to weigh approximately 20 grams. The meat sample is cooked at a temperature of around 250° F. for about 20 seconds or until such time as the pink color has left the meat. The sample is then placed on lower plate 13, and the upper plate 2 is brought down on top of plate 13 and is rigidly clamped thereto. The motor is started and the carriage and the upper plate are driven, through the medium of shaft 5, to the left as viewed in Fig. 1. Lower plate 13 is also moved in the same direction due to the resistance set up by the meat sample clamped between the plates. When the resistance offered by the meat sample to the movement of the upper plate has been overcome, the meat fibers have been ruptured by the action of the multiplicity of grooves and ridges on the plates and the upper plate is driven past the lower plate. This is the point at which the maximum resistance has been overcome and the force required to effect the maceration is visually recorded in suitable units on the dial scale of force measuring device 15, preferably in pounds pull. The measurement of the force required to effect rupture of the meat fibers is, therefore, a measure of the tenderness of the particular meat sample, and the force required, of course, is inversely proportional to the tenderness of the meat product.

In testing a large number of samples from different types of animal carcasses with the present device, it has been found that a scale reading on force measuring device 15 of from 40 to 90 pounds indicates a satisfactory degree of tenderness of the meat samples. Meat samples falling within this range were cooked and tested organoleptically and the correlation between these two sets of tests was found to be excellent.

Obviously, many modifications and variations of the invention as hereinbefore set forth may be made without departing from the spirit and scope thereof, and therefore only such limitations should be imposed as are indicated in the appended claims.

I claim:

1. An apparatus for testing the tenderness of a sample of meat product, which comprises a pair of parallel plates mounted for parallel movement relative to each other and having corrugations on their adjacent surfaces, means mounted on said plates for applying pressure to said plates in a direction normal to their surfaces, means connected to one of said plates for positively driving the plate, and means including a scale connected to the other of said plates to apply resistance to the other plate to prevent movement in unison with the plate which is subjected to positive drive, whereby said sample when placed between the plates becomes macerated when the plates are moved relative to each other.

2. An apparatus for testing the tenderness of a sample of meat product, which comprises a support, a pair of corrugated parallel plates mounted for parallel movement on said support, said plates being spaced a predetermined distance apart and having the corrugations on their inner surfaces, means mounted on said plates for applying pressure to a sample placed between the corrugated plates, means connected to one of said plates to positively drive that plate in one direction, and means including a scale connected to the other of said plates for urging the other plate in the opposite direction.

3. An apparatus for testing the tenderness of a sample of meat, which comprises a support, a track on said support, a corrugated member movable in said track, a second corrugated member cooperating with said first-mentioned member to hold said sample between the corrugations of said members, means mounted on said members for applying pressure to the sample between said members, means connected to one of said members for positively driving said member relative to the other member, means connected to said other member for applying resistance to the movement of the other member in unison with the driven member, and means attached to said last-mentioned means for measuring said resistance.

4. An apparatus for testing the tenderness of a sample of meat product, which comprises a support, a track in said support, a horizontal corrugated plate movable in said track, a second track in said plate, a second horizontal corrugated plate movable in said second track, said plates being superimposed with the corrugations cooperating to hold said sample therebetween, means connected to said first-mentioned plate to positively drive the plate, and means including a scale connected to the second plate to resist movement of the second plate in unison with the positively driven plate.

References Cited in the file of this patent
UNITED STATES PATENTS

| Number | Name | Date |
|---|---|---|
| 1,327,838 | Naylor | Jan. 13, 1920 |
| 1,665,933 | Rodman | Apr. 10, 1928 |
| 2,037,529 | Mooney | Apr. 14, 1936 |
| 2,117,402 | Cobert | May 17, 1938 |
| 2,424,177 | Lawshe et al. | July 15, 1947 |
| 2,427,796 | MacDonald | Sept. 23, 1947 |
| 2,481,467 | Bloom et al. | Sept. 6, 1949 |